Patented Jan. 21, 1941

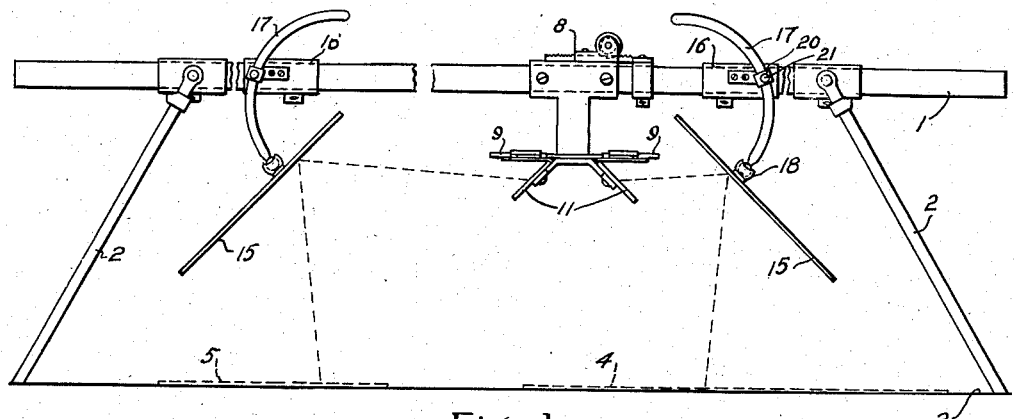
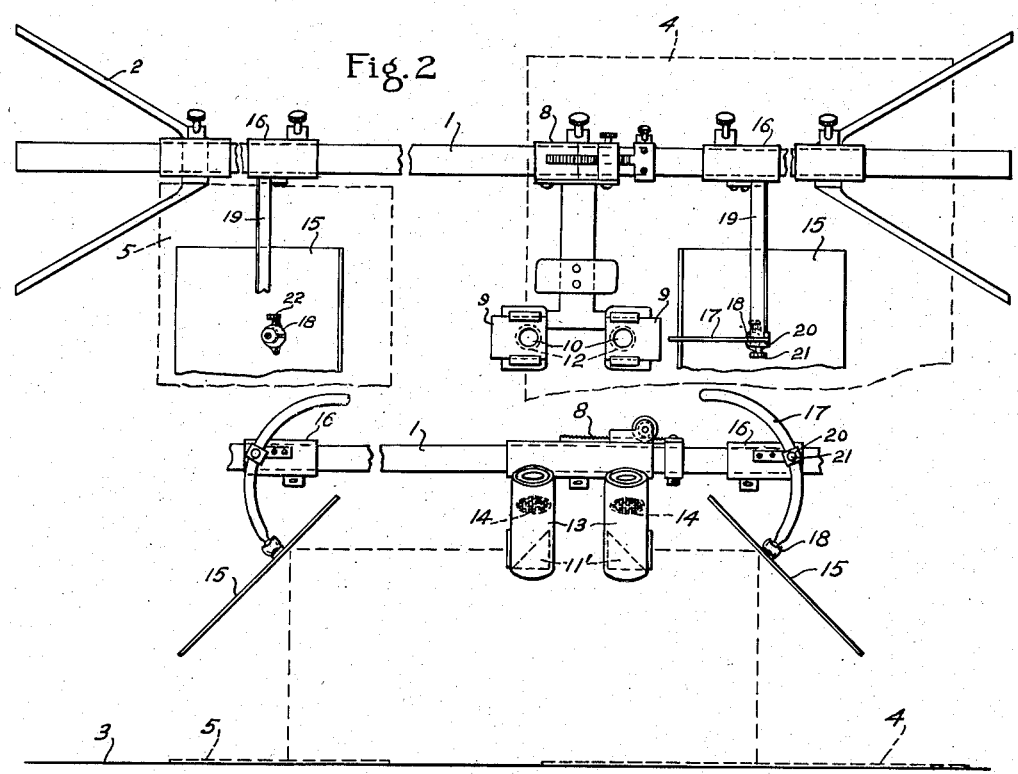

2,229,424

UNITED STATES PATENT OFFICE 2,229,424

MAP MAKING AND APPARATUS THEREFOR

Harold Emery Seely, Ottawa, Ontario, Canada

Application December 5, 1938, Serial No. 244,025

12 Claims. (Cl. 88—24)

This invention relates to map making and more particularly to the transference of details from air photographs, maps or the like of varying scales to a map, under preparation, of a given scale.

The object of the invention is to provide a method and means whereby, by the simultaneous use of both eyes of the operator, the photograph or map to be transferred and that under preparation may be observed independently and the image of the former at changed scale superimposed on that of the latter to enable the operator to accurately trace in the desired details, from the photograph or map, as the case may be, to the map under preparation. In carrying out the invention the line of sight of each of the two eyes is directed and on looking at the two maps simultaneously the ratio of the length of the line of sight of one eye to that of the other is varied in accordance with the change of scale required to visually precisely superimpose the photograph, map or the like to be transposed, upon and at the scale of the map under preparation.

The invention will be described with reference to the accompanying drawing which more or less diagrammatically illustrates apparatus embodying the invention and in which Figure 1 is a side elevation of one form of the device, Figure 2 is a plan view of the device of Figure 1, and Figure 3 is a side elevation of a somewhat modified form.

In the drawing I represents a horizontal support mounted on legs 2 resting on a drafting table or the like 3 on which is placed a map 4 in course of preparation and a photograph, map or the like 5 from which detail is to be transferred to map 4. A dual eye-piece or vision directing device is adjustably mounted on the supporting bar I and is preferably provided with a slow motion precision adjusting device 8, of any well known character, such as the rack and pinion. As shown in Figures 1 and 2 the dual eye-piece or vision directing device includes the laterally adjustable plate 9, for each eye, with a sight opening 10 therein and the mirrors 11 inclined at about 45° for laterally directing the line of vision. The openings 10 are preferably provided with lenses 12 of desired focal lengths, which usually will be different for each opening.

As shown in Figure 3 telescopes 13 are used and the mirrors or reflecting prisms 11' are located within the telescopes for laterally directing the lines of vision. At the focal plane of each eye-piece is a device 14 adapted to provide "fusion markings." This device may be, for example, a glass reticule inscribed with a grid of squares, say, 0.01″ in size, preferably with, for example, every fifth line heavier than the others. The two devices are identical and, preferably may be mounted on threaded sleeves for interchangeability. The telescopes are arranged for binocular vision and are of unity magnification.

A mirror or other reflector 15 is slidably mounted on the bar I on each side of the dual eye-piece 6. The mounting shown comprises a sleeve 16, an arcuate member 17 connected with the mirror by a universal joint 18 and to the sleeve through the offsetting member 19 having a bearing 20 and set-screw or the like 21. The universal joint is provided with some suitable locking device 22. Each of the mirrors, the dual eye-piece and the legs may be freely moved along the support and fixed at any desired point by means of set screws or the like as indicated. The mirrors 15 are shown located at an angle of 45° to the horizontal but are rotatable downward or upward to any angle desired for plotting from tilted vertical air photographs or from oblique air photographs taking into account variations in the convergence of the eyes as illustrated in Figure 1. Similarly the mounting provides for rotation of the mirrors in the other direction to provide for lateral tilt in air photographs.

In operation by a right-handed draftsman the device is placed on the table with the legs extended to a convenient position on the bar I, the mirror 15 on the right is also adjusted on the bar to any convenient position and the map 4 under preparation, of a desired scale, is located beneath this mirror. The dual eye-piece 8 is fixed to the bar at a point convenient to the eye and movement of the right hand of the operator. The air photograph or the like 5, regardless of its scale measurement, from which details are to be plotted on map 4, is placed beneath mirror 15 on the left. The operator, using both eyes, then looks through the dual eye-piece 6 which with the mirrors 15 acts in the manner of a dual periscope to simultaneously disclose to the operator's view the map 4 and the photograph 5, while the length of the line of vision or optical beam of one eye of the operator is different from that of the other. The relative lengths of these lines of vision are then changed, by moving mirror 15 on the left, and fine adjustment of the eye-piece 8, to cause the photograph 5 to appear precisely superimposed upon map 4 at the scale of the latter. With practice the adjustment of the relative parts of the device may be quickly made and with great accuracy in relation to the scale measurement of the two objects under consideration and within any practical limits as to such measurements. With photograph 5 thus visually superimposed on map 4 the operator readily may trace on the latter such details as are desired.

The device illustrated in Figure 3, involving the use of telescopes, is particularly convenient in operation since the ratio of the conjugate foci of each telescope may readily be adjusted to the different lengths of the two optical beams. Since, in operation, the two optical beams are always of different lengths, the ratio of the conjugate foci of each telescope always differs from that of the other.

It will be apparent that the adjustability of the mirrors 15, with reference to the vertical as well as the horizontal plane, makes simple provision for variation in the angular position of the mirrors to take care of tilt in vertical air photographs, and rectification of oblique photographs, as well as the tendency of the line of sight of the eyes to converge, while the so-called "fusion markings" in the telescopes of Figure 3 facilitate greater accuracy in plotting owing to their control of the convergence of the eyes.

In the construction of a base map from oblique air photographs, the photograph is set at a distance from the perspective centre of the telescope equal to the lens principal distance (focal length), or some multiple thereof, of the air camera which was used in taking the photograph. The photograph is placed beneath the left hand mirror so that its principal point is directly in line with the centre of the "fusion markings." While the left hand mirror is set at an angle of 45° from the horizontal the right hand mirror is rotated, or the map itself is tilted on a movable platform, until the line of vision of the right eye through the centre of the "fusion markings" makes, with the plane of the paper, an angle equal to the tilt of the camera axis when the photograph was taken. Thus the geometrical relations between the air camera and the land surface are re-established. The plotting of a flight of photographs is carried on in the same manner as regularly employed for high oblique photographs, except that, in lieu of perspective grids, the present device is used to plot the position of the required control points. Changes in altitude from photograph to photograph are compensated by slight changes in the elevation of the instrument above the plotting paper.

The term "eye-piece" as used in the specification and claims has been employed in its nontechnical sense and is intended to cover any member through which the vision of the eye is directed and which may include any lens or combination of lenses.

I claim:

1. A device for making maps of a particular scale from photographs, scenes, maps or the like of different scales, comprising means adapted to direct the lines of vision of the eyes of an operator, means adapted to hold the map under preparation in the optical beam of one eye and the photograph or the like in the optical beam of the other eye a reflector for each line of vision and a substantially horizontally mounted bar on which said vision directing means and said reflectors are adjustably mounted, at least one of said reflectors being widely movable on said bar in relation to said vision direction means to make the length of one optical beam greater than that of the other optical beam whereby the scale of one map is visually reduced to that of the other.

2. A device for making maps of a particular scale from photographs, maps or the like of different scales comprising a substantially horizontally mounted supporting bar of substantial length, means carried by said bar for laterally directing the line of vision of each eye and including a transparent member with fusion marking located in the focal plane, means adapted to hold the map under preparation in the optical beam of one eye and the photograph or the like in the optical beam of the other eye and a reflector movably mounted on said bar on each side of said vision directing means to adjust the ratio of the lengths of the optical beams to the ratio of the scales of the maps under consideration.

3. A device for making maps of a particular scale from photographs, scenes, maps or the like of different scales, comprising a support, means on said support for oppositely directing the lines of vision of the eyes of an operator, a reflector in the path of each oppositely directed line of vision for downwardly directing the latter, and means for movably mounting each of said reflectors on said support whereby each may be moved independently towards and away from its vision directing means to decrease or increase the length of the optical beam from the related eye.

4. A device for making maps as defined in claim 3, including a fusion grid in each line of vision for controlling convergence of the eyes.

5. A device for making maps of a particular scale from photographs, scenes, maps or the like of different scales, comprising a horizontally positioned supporting bar of substantial length, means adjustably mounted on said bar for oppositely directing the lines of vision of the eyes of an operator, a reflector in the path of each oppositely directed line of vision for downwardly directing the latter, means carrying each reflector, each said carrying means being slidably mounted on said bar whereby each with its reflector may be moved towards and away from the respective vision directing means.

6. A device for making maps of a particular scale from photographs, scenes, maps or the like of different scales, comprising a support, a telescope for each eye on said support and having means for oppositely directing the lines of vision of the eyes of an operator, a reflector in the path of each oppositely directed line of vision for downwardly directing the latter, means for movably mounting each of said reflectors on said support whereby each may be moved independently towards and away from its respective vision directing means, and means in each telescope for controlling the convergence of the eyes.

7. A device for making maps of a particular scale from photographs, scenes, maps or the like of different scales, comprising a support, an eyepiece for each eye of an operator mounted on said support, each eyepiece having a lens of focal length different from that of the other and means for laterally directing the lines of vision of the eye, a reflector in the path of each laterally and oppositely directed line of vision for downwardly directing the latter, and means for movably mounting each of said reflectors on said support whereby each may be moved independently towards and away from its respective eyepiece.

8. A device for making maps of a particular scale from photographs, scenes, maps or the like of different scales, comprising a horizontally positioned supporting bar of substantial length, a telescope for each eye of an operator mounted on said support, each telescope having the ratio of its conjugate foci different from that of the other, a grid in each telescope, and means for laterally directing the line of vision of each eye, a reflector in the path of each laterally and oppositely directed line of vision for downwardly directing the latter, means carrying each reflector, each said carrying means being slidably mounted on said bar whereby each with its reflector may be moved towards and away from its respective telescope.

9. A device for making maps of a particular scale from photographs, scenes, maps or the like of different scales comprising a support adapted to be mounted above a plane drawing surface, a dual eye piece mounted on said support, means adapted to support the map under preparation in the optical beam of one eye and the photograph or the like in the optical beam of the other eye and movable means independent of said dual eye piece for varying the length of the optical beam of one eye in relation to that of the other to superimpose the image of the photograph, scene, map or the like on that of the map under preparation at the scale of the latter.

10. A device for making maps of a particular scale from photographs, scenes, maps or the like of different scales comprising a support substantially horizontally arranged for mounting above a plane drawing surface, a dual eye piece on said support for directing the optical beam of each eye of an operator respectively to the map under preparation and the photograph or the like and means, independent of said eye piece, movable on said support towards or from said eye piece to vary the length of the optical beam of one eye in relation to that of the other to superimpose the image of the photograph or the like on that of the map under preparation at the scale of the latter.

11. A device for use in adding detail to an incomplete map of a particular scale from photographs, scenes, maps or the like of different scales comprising a supporting bar, means for mounting said bar above a plane drawing surface, a dual eye piece mounted on said bar for directing the optical beams of the eyes of an operator respectively to the map under preparation and the photograph or the like, means located in each optical beam for controlling convergence of the eyes, and movable means independent of said dual eye piece for varying the length of the optical beam of one eye in relation to that of the other to superimpose the image of the photograph or the like on that of the map under preparation at the scale of the latter.

12. A device for making maps of a particular scale from photographs, maps or the like of a different scale comprising a horizontally extending supporting bar of substantial length, means carried by said bar for laterally directing the optical beam of each eye, means adapted to hold the map under preparation in the optical beam of one eye and the photograph or the like in the optical beam of the other eye, a fusion grid located in the optical beam of each eye, and means movably mounted on said bar to adjust the ratio of the lengths of the optical beams of the eyes to the ratio of the scales of said map and photograph or the like.

HAROLD EMERY SEELY.